May 21, 1963  E. A. DIXON  3,090,718
FLEXIBLE CUSHIONED HORSE SHOE
Filed April 21, 1960  3 Sheets-Sheet 1

INVENTOR.
ELLSWORTH A. DIXON
BY
ATTORNEY

May 21, 1963 E. A. DIXON 3,090,718
FLEXIBLE CUSHIONED HORSE SHOE
Filed April 21, 1960 3 Sheets-Sheet 2

*INVENTOR.*
ELLSWORTH A. DIXON
BY
ATTORNEY

*INVENTOR.*
ELLSWORTH A. DIXON

United States Patent Office 3,090,718
Patented May 21, 1963

3,090,718
FLEXIBLE CUSHIONED HORSE SHOE
Ellsworth A. Dixon, Savage, Md.
Filed Apr. 21, 1960, Ser. No. 23,695
7 Claims. (Cl. 168—7)

It is an object of this invention to provide a shoe for racing horses which improves over the shoe disclosed in my prior Patent No. 2,622,685, dated December 23, 1952.

It is a further object of this invention to provide a series of shoes adaptable to the varying needs of the horses' hooves for relief from cramping.

It is a further object of this invention to provide shoes as aforesaid which will add two or more years to the racing life of thoroughbreds.

It is a further object of this invention to provide shoes as aforesaid which will increase the comfort of older horses and enable them to live far longer than would be the case were they denied them and their destruction be ordered.

The above and other objects will be made clear in the following detailed description taken in connection with the annexed drawings in which.

The anatomy of a horse's hoof is quite unexpectedly complex. The bone and muscle structure inside the hoof is quite comparable to that of the human wrist or ankle, or, for the matter of that, the human foot. Now, just as too tight a shoe will cramp a human foot, so will an inflexible shoe cramp a horse's hoof. It will be realized, of course, that the hoof is always contracted when the shoe is applied. This long has been recognized and the prior art abounds with examples of attempts to meet this problem. Prior to the instant invention, however, none of these has succeeded fully in meeting the problem at a tolerable cost.

Thousands of horse shoes have been patented, but few of these have gone into actual use. The aluminum racing plates definitely have proved their worth and about ninety-eight percent of all thoroughbreds running today wear such "plates" or shoes. In racing, the horse's hoof encounters terrific impact which is primarily vertical. Most of this, of course, travels through the horse's leg, but a large portion is expended laterally and tends to expand the hoof, and, equally of course, there is a vertical compressive effect on the hoof. In short, the hoof at the moment of impact, and if free of shoes, would have a radically different shape that it has when in the air or even when the horse is standing still.

Even conventional racing shoes may be presumed to flex to some extent, and the shoe of my prior patent was expressly designed to accommodate this flexing. What neither my prior patent nor the prior art in general realized with the extent to which the cushioning aids the horse. In a combination metal and rubber shoe, the rubber is of the utmost importance. It is this feature with which the present invention is primarily concerned. The present invention improves on the above noted patent in eliminating the flanges alongside the rubber calks. This, by permitting greater lateral expansion of the rubber improves the cushioning effect, and also permits self-elimination of dirt in the region of the nail holes. It is also to be noted that the front hooves of a running horse strike the ground heel first, while the rear hooves strike toe first. This puts the two sets of hooves through different exansion cycles, and for optimum effect the shoes may well be differentiated as between the two sets of hooves.

Figure 1:
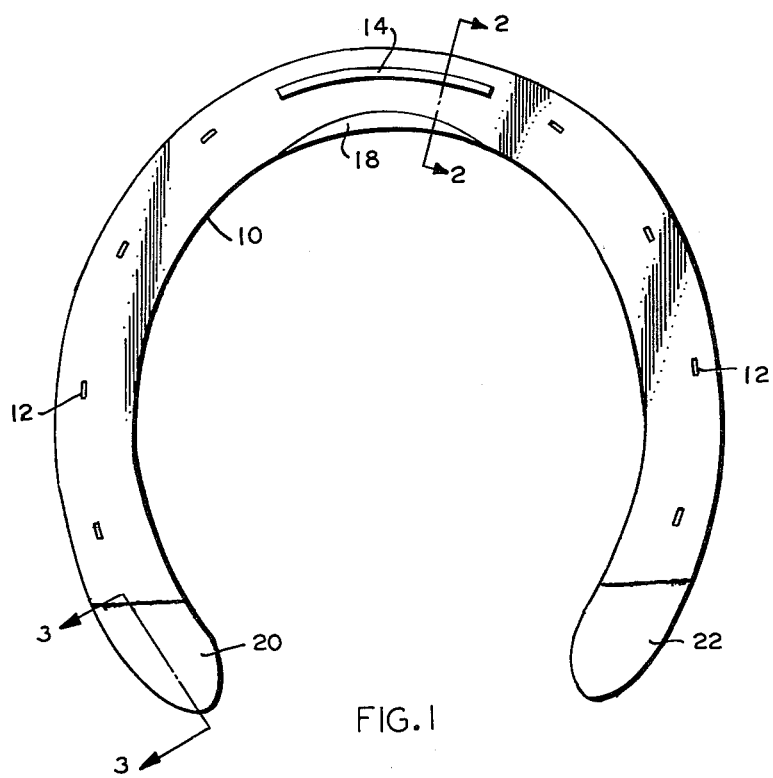
FIGURE 1 is a plan view of the metal base of one form of shoes.
Figure 2:
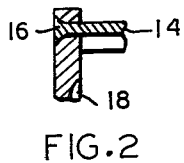
FIGURE 2 is a section on the line 2—2 of FIGURE 1.
Figure 3:
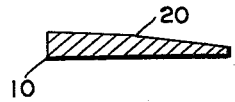
FIGURE 3 is a section on the line 3—3 of FIGURE 1.
Figure 15:
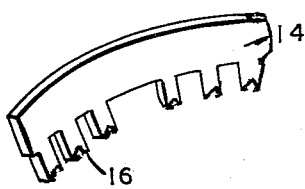
FIGURE 15 is a perspective view of a preferred toe piece.

Referring now to FIGURE 1, there is shown a metal blank or base 10 formed of aluminum or similar light weight metal or alloy. In it are formed the conventional nail holes 12. A toe piece of spring steel 14 has prongs 16 which, preferably are pierced through the material of the base 10, where they act as punches and having slightly forked ends, are riveted in place as shown in FIGURE 2. The base 10 is relieved adjacent the toe piece 14 at 18 as shown in FIGURES 1 and 2. It is also relieved adjacent each of its free extremities 20 and 22 as shown in FIGURES 1 and 3.

Figure 4:
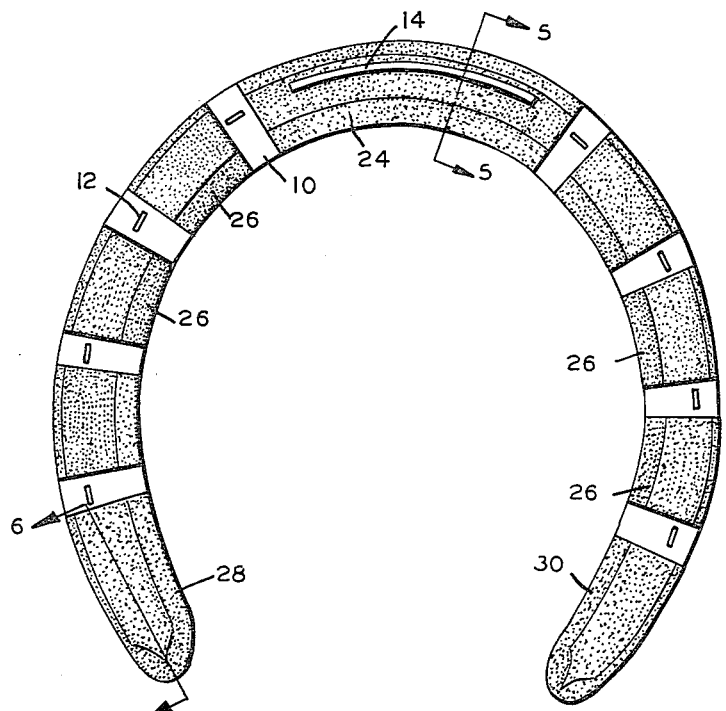
FIGURE 4 is a plan view similar to FIGURE 1 but showing the completed shoe.

FIGURE 4 shows the completed shoe which has a section 24 of relatively hard rubber of tire tread grade vulcanized to it adjacent and surrounding the toe piece 14 and additional sections 26 vulcanized to it between the nail holes 12 and sections 28 and 30 over the extremities 20 and 22. All of the sections 24, 26, 28 and 30 are of equal height. The section 24 fills the relieved portion 18, thus adding to the cushioning effect at the toe, while the relieved portions 20 and 22 increase the thickness of rubber and therefore the cushioning effect at the heel.

The importance of increased cushioning at toe and heel already have been noted.

Figure 7:
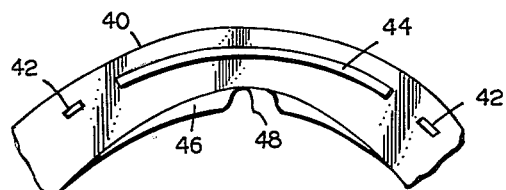
FIGURE 7 is a partial plan view of the toe portion of a modified form of metal base.
Figure 8:
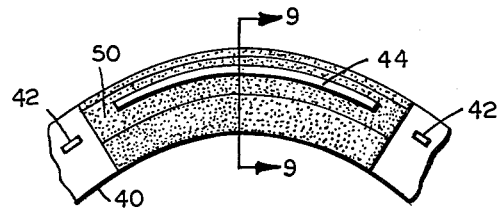
FIGURE 8 is a view similar to FIGURE 7 showing the completed toe portion.
Figure 9:
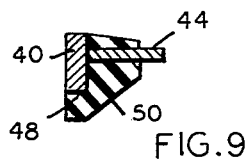
FIGURE 9 is a section on the line 9—9 of FIGURE 8.
Figure 10:
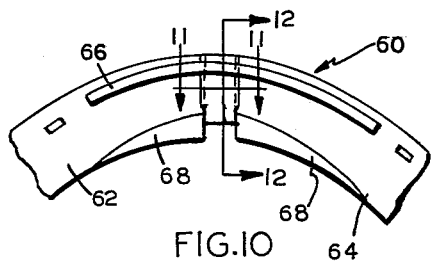
FIGURE 10 is a partial plan view of the toe portion of another form of metal base.
Figure 11:
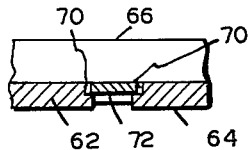
FIGURE 11 is a section on the line 11—11 of FIGURE 10.
Figure 12:
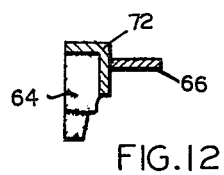
FIGURE 12 is a section on the line 12—12 of FIGURE 10.

In FIGURES 7, 8 and 9 there is shown a portion of a base 40 having nail holes 42 and a toe piece 44. The base 40 is relieved at 46, and is also notched at 48. The notch increases the lateral flexibility of the base 40. A body of rubber 50 is vulcanized to the base 40 and surrounds the toe piece 44. In all other respects the final shoe is like the one discussed in connection with FIGURES 1 through 6.

In FIGURES 10 through 13 there is shown a base 60 made up of two separate portions 62 and 64. These are joined by a toe piece 66, the legs of which pierce both base sections. Each section is relieved at 68 in the manner previously discussed. Each section is further relieved at 70 to receive a clip 72. A body of rubber 74 is vulcanized to the portions 62 and 64 and around the toe piece 66 (see FIGURE 13) and also surrounds the clip 72 and completely fills the space between the sections 62 and 64. The rest of the finished shoe is the same as discussed in connection with FIGURES 1 and 6. This particular form of shoe provides maximum lateral flexibility.

Figure 5:
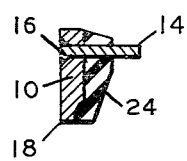
FIGURE 5 is a section on the line 5—5 of FIGURE 4.
Figure 6:
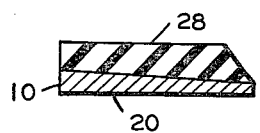
FIGURE 6 is a section on the line 6—6 of FIGURE 4.
Figure 13:
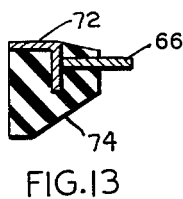
FIGURE 13 is a section taken on the line 12—12 of FIGURE 10 but showing the completed shoe.
Figure 14:
FIGURE 14 is a section similar to FIGURE 13, but showing still another form.

FIGURE 14 is a section similar to the FIGURES 5, 9 and 13 but shows a base 80, relieved at 82 and having a body of rubber 84 vulcanized thereto. Such a shoe, without a metal toe piece is an excellent pasture shoe for a horse with a tendency to lameness.

It will be seen that this invention provides a family of shoes adapted to all conditions of a horse's hoof that may be encountered. Moreover, by selecting optimum shoes from the family, the horse can be conditioned to the most desirable degree of flexibility, starting with the most rigid forms and going progressively to shoes of greater flexibility.

I claim:

1. A shoe for race horses comprising: a U-shaped base formed of light weight metal, said base being of uniform thickness through most of its extent and having the usual nail holes; a narrow hardened metal toe piece having a plurality of integral spaced projections at one edge, said projections piercing and displacing the metal of said base and having their free ends riveted against the opposite side of said base, said toe piece providing a flange normal to said base, parallel thereto and spaced between the margins of said base; a body of rubber secured to said base, surrounding said toe piece on all sides and terminating short of the adjacent nail holes, said body being of uniform height above the outer surface of said base, but of less height than said toe piece and spaced bodies of rubber secured to said base between the nail holes in said base and between the nail holes adjacent the free ends of said U-shaped base and the said free ends of the base, said base having substantially plane surfaces adjacent said bodies of rubber to permit lateral expansion of said bodies under impact.

2. A shoe for race horses as set forth in claim 1 in which the body of rubber adjacent the toe piece has increased thickness adjacent its center.

3. A shoe for race horses as set forth in claim 1 in which the bodies of rubber adjacent the extremities of the base increase in thickness from the adjacent nail holes to said free ends.

4. A shoe for race horses as set forth in claim 3 in which the body of rubber adjacent the toe piece has increased thickness adjacent its center.

5. A shoe as set forth in cliam 1 in which the base is formed of two halves spaced at the center of the U; the facing extremities of said halves being relieved adjacent said toe piece; a thin, metal L-shaped clip between said halves, said clip having one leg fitting said relieved portions and defining the spacing between halves, the other leg extending between the halves to a level substantially flush with the outer surface of the base, the space between halves being filled with the same body of rubber that surrounds the toe piece.

6. A shoe for race horses comprising: a U-shaped base formed of light weight metal, said base being of uniform thickness through most of its extent and having the usual nail holes; spaced bodies of rubber vulcanized to said base between said nail holes and at the extremities of said base, said bodies of rubber being of uniform height above the outer surface of said base, the body of rubber lying between the nail holes adjacent the toe having increased thickness adjacent its central portion and the bodies of rubber at the extremities of the base increasing in thickness from the adjacent nail holes toward said extremities, said base having substantially plane surfaces adjacent said bodies of rubber to permit lateral expansion of said bodies under impact.

7. A horse shoe blank comprising a U-shaped strip of thin, soft light metal; a hardened steel toe piece having tongues projecting from one of its edges, said tongues having their free ends piercing and displacing the metal of the U-shaped strip and being lightly riveted flush with the strip, the U-shaped strip being made up of halves spaced adjacent said toe piece, the facing extremities of said halves being relieved adjacent said toe piece; a thin, metal L-shaped clip between said halves, said clip having one leg fitting said relieved portions and defining the spacing between halves, the other leg extending between the halves to a level substantially flush with the outer surface of the base, said halves and said clip being secured in assembly by said toe piece.

References Cited in the file of this patent

UNITED STATES PATENTS

| 124,203 | Freleigh | Mar. 5, 1872 |
| 506,820 | Jerome | Oct. 17, 1893 |
| 643,272 | Paar | Feb. 13, 1900 |
| 752,468 | Robinson | Feb. 16, 1904 |
| 762,998 | Higgins | June 21, 1904 |
| 912,258 | Paar | Feb. 9, 1909 |
| 1,953,281 | Veran | Apr. 3, 1934 |
| 2,024,265 | Anderson et al. | Dec. 17, 1935 |
| 2,157,826 | Kearney | May 9, 1939 |
| 2,264,897 | Becker et al. | Dec. 2, 1941 |
| 2,622,685 | Dixon | Dec. 23, 1952 |
| 2,663,270 | Friedly | Dec. 22, 1953 |
| 2,995,810 | Wilson et al. | Aug. 15, 1961 |

FOREIGN PATENTS

| 5,405 | Great Britain | of 1892 |